(12) United States Patent
Ross

(10) Patent No.: US 6,185,640 B1
(45) Date of Patent: Feb. 6, 2001

(54) MINIMAL FRAME BUFFER MANAGER ALLOWING SIMULTANEOUS READ/WRITE ACCESS BY ALTERNATELY FILLING AND EMPTYING A FIRST AND SECOND BUFFER ONE PACKET AT A TIME

(75) Inventor: Kevin Ross, Sunnyvale, CA (US)

(73) Assignee: Philips Electronics North America Corporation, New York, NY (US)

( * ) Notice: Under 35 U.S.C. 154(b), the term of this patent shall be extended for 0 days.

(21) Appl. No.: 09/100,828

(22) Filed: Jun. 19, 1998

(51) Int. Cl.[7] ....................................................... G06F 13/00
(52) U.S. Cl. .............................. 710/53; 710/52; 710/129
(58) Field of Search .................................. 710/52, 53, 129

(56) References Cited

U.S. PATENT DOCUMENTS

| | | | |
|---|---|---|---|
| 5,163,132 | * 11/1992 | DuLac et al. ............................ | 710/53 |
| 5,337,414 | 8/1994 | Hashemi et al. ........................ | 710/52 |
| 5,359,623 | 10/1994 | Nakamura ............................... | 369/32 |
| 5,513,376 | * 4/1996 | Lohmeyer ............................... | 710/53 |
| 5,572,691 | * 11/1996 | Koudmani ................................ | 711/5 |
| 5,740,466 | 4/1998 | Geldman et al. ....................... | 710/5 |
| 5,826,041 | * 10/1998 | Ogus ........................................ | 709/234 |
| 5,884,028 | * 3/1999 | Kindell et al. ........................ | 709/234 |
| 5,923,901 | * 7/1999 | Kawaura ................................. | 710/53 |
| 6,032,206 | * 2/2000 | Ohtaki .................................... | 710/53 |
| 6,097,499 | * 8/2000 | Casey et al. .......................... | 358/1.16 |
| 6,112,267 | * 8/2000 | McCormack et al. ................. | 710/52 |
| 6,122,681 | * 9/2000 | Aditya et al. .......................... | 710/52 |

FOREIGN PATENT DOCUMENTS

| | | |
|---|---|---|
| 09101865 | 4/1995 | (JP) . |
| 08152973 | 6/1996 | (JP) . |
| WO9908264 | 2/1999 | (WO) .............................. G11B/5/09 |

* cited by examiner

*Primary Examiner*—Thomas C. Lee
*Assistant Examiner*—Tammara Peyton
(74) *Attorney, Agent, or Firm*—Steven R. Biren

(57) ABSTRACT

Methods and arrangements are provided for a block decoder in the form of a single integrated circuit (IC) for use in a variety of data storage devices. The block decoder is configured to transfer streaming data from the storage medium to an external device, such as a host computer's processor, without introducing any significant overhead induced latency into the data transfer. This is accomplished by employing a purely hardware-based logic and substantially minimizing the amount of buffering of data that is required within the storage device. The resulting block decoder can be integrated into a single IC because the amount of buffering memory that is required can be economically fabricated using conventional logic fabrication processes, such as complementary metal oxide semiconductor (CMOS) processes.

19 Claims, 6 Drawing Sheets

MINIMAL FRAME BUFFER MANAGER ALLOWING SIMULTANEOUS READ/WRITE ACCESS BY ALTERNATELY FILLING AND EMPTYING A FIRST AND SECOND BUFFER ONE PACKET AT A TIME

BACKGROUND OF THE INVENTION

1. Technical Field

The present invention relates generally to data storage devices, and more specifically to methods and arrangements that are employed to significantly reduce and/or minimize the amount of frame buffering that is required within the data storage device to adequately support transferring data from the storage device to a host device.

2. Background Art

An optical disc, such as, for example, a compact disc (CD) or digital versatile disc (DVD), is a nonmagnetic data storage medium on which relatively large amounts of digital information is stored by using a laser beam to burn microscopic indentations into a surface of the medium. The stored data is read using a lower-power laser to sense the presence or absence of the indentations.

There are many different types of optical disc systems (i.e., optical discs. formats and devices) available today. One of the most common optical disc systems used in contemporary personal computers (PCs) is the compact disc read-only memory (CD-ROM). CD-ROM provides a read only optical storage medium onto which data is stored only once and then read many times using a CD-ROM drive. A CD-ROM disc can contain a mixed stream of digital image, audio, video, and/or text data. Additional capacity is provided by a digital versatile disc read-only-memory (DVD-ROM). In the future, DVD-ROM will also be faster. Other advanced optical disc systems allow users to also write data to the optical disc. By way of example, a compact disc recordable (CD-R) system allows the user to write-once to each section of the optical disc, while a compact disc rewritable (CD-RW) allows the user to write to each section of the optical disc many times. Other notable optical disc systems include a compact disc magneto optical (CD-MO) disc, which is also rewritable.

Reading data from these exemplary optical disc systems typically begins with the PC's processor or host processor requesting that a block of data be scanned from the optical disc and transferred over a peripheral bus to the host processor or a primary memory. A block of data typically includes a plurality of smaller blocks or frames of data. These frames of data are typically pre-processed and gathered into groups within the optical disc drive, and then forwarded to the host processor over the peripheral bus. By of way example, an exemplary 16X CD-ROM drive for use with a PC typically includes a digital signal processing arrangement that pre-processes the retrieved data, and a buffer management arrangement that stores frames of data, which are typically between about 2 to about 3 kilobytes long, in a 128-kilobyte dynamic random access memory (DRAM) prior to transferring a group of frames (e.g., about 4 to 8 frames per group) to the host processor in a single burst.

One of the problems with this type of configuration is that a large memory capacity is required within the optical disc drive to adequately buffer the frames of data due to the inherent latency associated with a typical host processor, which can be interrupted from time to time by other circuits/devices. As such, the host processor will not necessarily be ready to receive the next group of frames, once gathered and prepared for burst transfer by the optical disc drive.

Additional latencies are introduced by the buffer management process within the optical disc drive. The buffer management process is usually conducted by a block decoder circuit that relies on an embedded firmware-based processor. This firmware-based processor is configured to run a real-time firmware program (e.g., a kernel program, polling loop, event driver, hybrid, etc.). While the buffer management process has a finite processing overhead, it too can be interrupted by other circuits within the block decoder and/or optical disc drive from time to time. Additionally, there are added overhead latencies associated with the burst transfer of a group of frames, which may require the firmwarebased processor to be interrupted, for example, to process a certain number of frames (e.g., up to 10 frames) for each interrupt. By way of a further example, the buffer management process needs to able to coordinate a burst transfer with the host processor. This typically includes additional signaling and is subject to further delays if the host processor is busy or interrupted. Consequently, the latency introduced by the buffer manager varies and can be significant at times.

In an effort to provide an acceptable data transfer rate from the optical disc drive to the host processor, a significantly large and often expensive external memory (e.g., DRAM) is provided within the optical disc drive. This external memory is used by the buffer manager to store frames of data and accommodate the uncertain latency of the overall system.

To further complicate matters, as the speed of optical disc drives increases, the amount of memory required within the optical disc drive will likely need to increase as well. For example, certain conventional 32X CD-ROM drives, which run at twice the speed of a 16X CD-ROM having an external 128-kilobyte DRAM, often require an additional 128-kilobytes of memory in the form of an external 256-kilobyte DRAM.

Thus, there is a need for methods and arrangements that reduce the latency introduced by an optical disc drive, and consequently the amount of memory required in the optical disc drive, so as to support increasing data transfer rates.

SUMMARY OF THE INVENTION

The methods and arrangements in accordance with the present invention significantly reduce the latency introduced by an optical disc drive by replacing a conventional block decoder having a firmware-based processor, with an improved block decoder, having a purely hardware-based digital logic design. Unlike a conventional block decoder, the improved block decoder preferably transfers a frame or less of data at a time, rather than a group of frames. Consequently, the amount of memory required in the optical disc drive is significantly reduced to an amount that can be advantageously included with the digital logic in a single block decoder integrated circuit. Thus the improved block decoder reduces the complexity of the optical disc drive, tends to lower manufacturing costs, while also supporting increased data transfer rates.

In accordance with certain aspects of the present invention, the various embodiments of the present invention can be used for a variety of data storage devices including optical disc drives, magnetic drives/tapes, and similar data storage devices that stream data at a substantially fixed rate.

The above stated needs and others are met by a data storage device that can be used in a computer system. The data storage device includes a storage medium, and a read assembly that is arranged to read data from the storage medium and output a read signal. A data engine is also provided to receive the read signal and output digital data based on the read signal. A decoder circuit is then used to sequentially output a first portion of the digital data and a second portion of the digital data. The decoder circuit, which is advantageously formed on a single integrated circuit die, includes both memory and logic. The logic identifies a first location and a second location within the memory. The logic stores the first portion of the digital data in the first location and the second portion of digital data in the second location. The logic is also configured to retrieve the first portion of the digital data from the first location and output the first portion of digital data, for example to an external device, while storing the second portion in the second location. Because of this integration and data transferring process, the data storage device has a substantially lower overhead latency, when compared to a firmware-based processor. This savings allows the data storage device to support faster data transfer rates.

In accordance with certain other embodiments of the present invention, the memory can be a random access memory (RAM), for example, either a dynamic RAM (DRAM) or static RAM (SRAM). The memory includes a first buffer and a second buffer, which are identified by their respective locations. In certain other embodiments, the first and second buffers are each about the same size as the first and second portions of digital data. Thus, for example, in certain embodiments the portions and buffers are each between about 2 and about 3 kilobytes in length. Other features, in still further embodiments, includes re-settable counters within the logic that identify how many bytes of the digital data have already been stored, and/or the status of the two buffers, or a plurality of buffers.

In accordance with other embodiments of the present invention, a method for transferring a block of data from a storage medium to an external device is provided. The method includes the steps of generating a streaming digital signal by sensing data recorded on a storage medium, and dividing the streaming digital signal into a plurality of packets. The method further includes using a single integrated circuit to: 1) store a first packet in a first buffer during a first time window, 2) store a subsequently generated second packet in a second buffer during a second time window, 3) retrieve the first packet from the first buffer during the second time window, and 4) provide the first packet to an external device during the second time window. This provides a substantially continuous process because the second time window begins immediately after the first time window ends.

In accordance with still other embodiments of the present invention, the single integrated circuit is also used to: 5) store a subsequently generated third packet in the first buffer during a third time window, and 6) retrieve the second first packet from the second buffer during the third time window. In such an embodiment, the method also includes the step of providing the second packet to the external device during the third time window. Again this provides a substantially continuous process because the third time window begins immediately after the second time window ends.

In accordance with yet another embodiment of the present invention a method is provided for use in a single integrated circuit that is configured to support a read operation within a storage device. The storage device is configured to generate a stream of data that is destined for an external device. The method includes the steps of: 1) storing portions of a stream of data to a first buffer, 2) storing subsequent portions of the stream of data to a second buffer, while also transferring the contents of the first buffer to an external device, 3) storing further subsequent portions of the stream of data to the first buffer, while also transferring the contents of the second buffer to the external device, and 4) repeating steps 1 through 4 until the stream of data stops.

Additional aspects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

Figure 1:
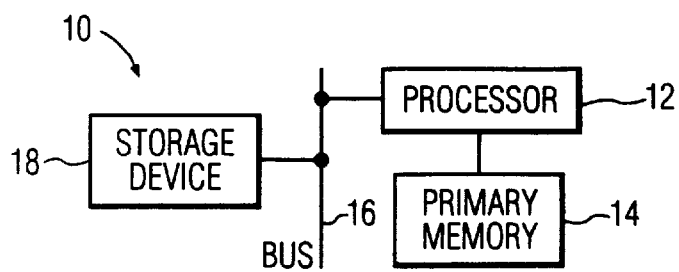
FIG. 1 is a block diagram depicting a conventional computer system having a storage device.

FIG. 1 is a block diagram depicting a portion of a conventional computer system 10, such as a PC, having a host processor 12, primary memory 14, bus 16, and a storage device 18. Host processor 12 is typically configured to read data from, and/or write data to, both primary memory 14 and storage device 18. Data that is read from storage device 18 is typically recorded into primary memory 14 before being processed by processor 12. Similarly, in certain configurations, data is read from primary memory 14 by host processor 12 and provided, over bus 16, to storage device 18, where it is written to a storage medium. Bus 16 is typically a peripheral bus, such as, for example, a Small Computer System Interface (SCSI), Advanced Technology Attachment Packet Interface (ATAPI), or similar formatted bus (e.g., a IEEE 1394 serial bus).

For purposes of simplicity, the remainder of this text focuses on a read operation, in which the host processor 12 has requested that a block of data be read from storage device 18 and provided to host processor 12 and/or primary memory 14, via bus 16. Those skilled in the art will recognize that the present invention can also be adapted to transferring data in support of a write operation, in which the host processor 12 transfers a block of data from primary memory 14 to storage device 18, via bus 16.

Figure 2:
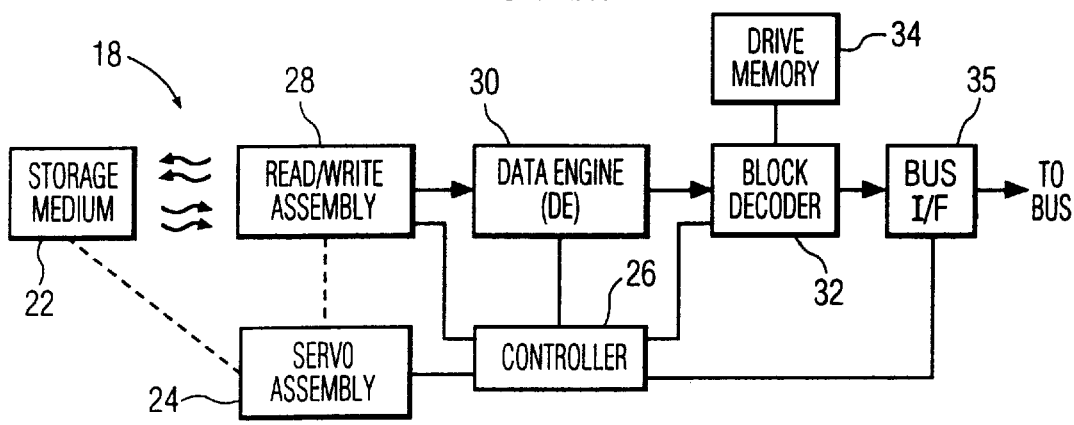
FIG. 2 is a block diagram depicting a conventional storage device, as in FIG. 1, having a separate block decoder and drive memory.

FIG. 2 is a block diagram depicting the major subsystems in an exemplary storage device 18, as in shown in FIG. 1. Storage device 18 includes a storage medium 22, such as, for example, a CD or DVD. Storage medium 22 is typically removable from storage device 18. When properly inserted into storage device 18, storage medium 22 will be supported within storage device 18 and rotatably moved by a servo assembly 24. Servo assembly 24 typically includes a spindle motor and mounting arrangement (neither of which are shown). Servo assembly 24 is connected to a drive controller 26. Drive controller 26 is typically a microprocessor that is configured to control the various subsystems in storage device 18 and communicate with host processor 12, through bus 16.

Data is read from (or written to), storage device 22 by a read/write assembly 28. For a read operation, read/write assembly 28 includes a laser diode and a laser pick-up circuit (neither of which are shown). Read/write assembly 28 is selectively positioned over storage medium 22 by servo assembly 24 during a read (or write) operation, under the control of controller 26. Data is usually stored on storage medium 22 along a continuous spiral track having a constant pit (e.g., data bit) size. Therefore, the information content is greater per revolution on the outside than on the inside of the storage medium.

Read/write assembly 28 is movable relative to storage medium 22 so that it can be positioned over a particular track and follow the track as the storage medium is rotated to read the desired data.

An analog signal is output by the read/write assembly 28 and provided to a data engine 30, such as, for example a digital signal processor (DSP). Data engine 30 converts the analog signal to a digital data stream, for example, using conventional analog-to-digital conversion techniques. Depending upon the type of storage device, data engine 30 can also be configured to descramble, correct, extract, exclude, and/or otherwise modify certain data in the data stream. For example, in certain CD-ROM drives, data engine 30 employs conventional demodulation techniques (e.g., data slicing) and cross interleaved Reed Solomon code (CIRC) correction techniques to extract main data (MD) and subcode data from the analog signal. The data on a conventional CD-ROM is separated into frames of data having about 2352 bytes of MD and 96 bytes of subcode data each.

The subcode data format actually includes 98 bytes, however, two of the bytes or slots are left blank to detect the start of the subcode frame. The remaining 96 slots contain one byte of subcode data each. As shown, data engine 30 is also connected to and responsive to device controller 26.

The resulting digital data from data engine 30 is provided to a block decoder 32. Block decoder 32 is configured to facilitate the transfer of the digital data to the host processor 12, via a bus interface 35 and bus 16. During a read operation, block decoder 32 gathers and stores the frames of data in a drive memory 34. Block decoder 32 then transfers a group of frames (e.g., about 4 to 8 frames) from drive memory 34 to host processor 12 in a single burst transfer, via bus interface 35 and bus 16. Block decoder 32 is described in more detail below. Block decoder 32 is connected to and responsive to device controller 26.

Drive memory 34 is typically a conventional DRAM chip that is connected to, but otherwise separate from, block decoder 32. The size and operational parameters of drive memory 34 vary, depending upon the operating speed of storage device 18, the operation and latency of block decoder 32, and the operation and latency of host processor 12. It is common for a CD-ROM to have the capability to store at least about 50 frames of data in drive memory 34, when the block decoder transfers groups of frames in a burst. By way of example, drive memory 34 usually needs to be about 128-kilobytes for a 16X CD-ROM, and up to about 256-kilobytes for a 32X CD-ROM.

Storage device 18 further includes a bus interface 35 that provides the connectivity to bus 16. Bus interface 35 is a conventional interface circuit that is specifically designed for the particular format of bus 16. Thus, for example, in certain configurations bus interface 35 can be a SCSI, ATAPI, IEEE-1394, or other like bus interface. Bus interface 35 is further connected to, and responsive to, drive controller 26.

Figure 3:
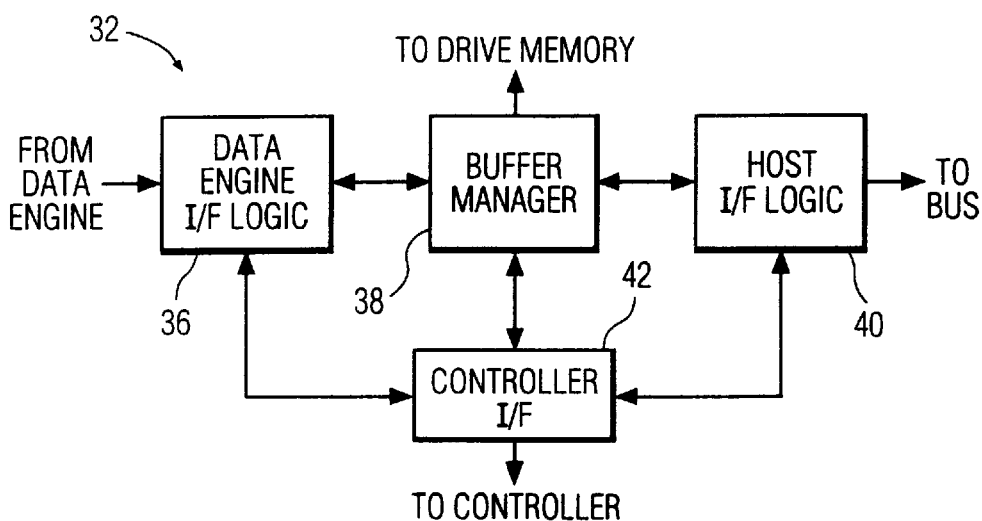
FIG. 3 is a block diagram depicting a conventional block decoder, as in FIG. 2, having a firmware-based buffer manager that is responsive to a firmware program and is configured to store groups of frames in the drive memory and transfer groups of frames at one time in a burst transfer.

FIG. 3 is a block diagram depicting an exemplary block decoder 32, as in FIG. 2, which transfers groups of frames in a burst. Block decoder 32 includes data engine interface logic 36, a buffer manager 38, host interface logic 40, and controller interface logic 42. Data engine interface logic 36 is configured to exchange data with data engine 30, and is responsive to commands from buffer manager 38, and drive controller 26, via controller interface logic 42. In certain configurations, data engine interface logic 36 is also configured to detect and correct synchronization and data errors for each frame of data. Thus, extensive, conventional error detection/correction is typically accomplished on the main data and subcode data within data engine interface logic 36.

Host interface logic 40 is configured to exchange data with bus interface 35, and is responsive to commands from buffer manager 38, and drive controller 26, via controller interface logic 42. Similarly, controller interface logic 42 is configured to facilitate the exchange of control information between drive controller 26 and buffer manager 38, data engine interface logic 36 and host interface logic 40.

Buffer manager 38 is typically a firmware-based processor that is operatively responsive to a real-time firmware program (which is typically stored in a read-only memory (ROM) (not shown) associated with controller 26). In support of a read operation, buffer manager 38 receives the stream of digital data through data engine interface logic 36 and stores the data as frames of data in drive memory 34. The firmware program typically employs the use of queue pointers (i.e., software pointers to various data queues) where the data is logically transferred from queue to queue.

Buffer manager 38 can be subjected to various interrupts during a read operation. By way of example, drive controller 26, data engine interface logic 36, or host interface logic 40 can interrupt buffer manager 38 to request a service. To support higher data transfer rates (e.g., associated with a 16X CD-ROM), and in an effort to minimize the impact of the latency induced by such interrupts, buffer manager 38 gathers a group of frames in drive memory 34 from data engine 30, and interrupts controller 26 when a predetermined number of frames are ready to be further processed by controller 26. For example, in certain configurations, ten frames of data are stored before block decoder 32 interrupts controller 26. This tends to reduce the interrupt rate of controller 26.

In the past, this solution (burst transferring groups of frames) has been able to support increasing data transfer rates, assuming drive memory 34 was large enough. Thus, subsequent generations of CD-ROM drives typically require a larger drive memory 34 and a correspondingly modified firmware program.

Following the recent move to 32X CD-ROM drives, the feasibility of this type of "upgrade" was called into question due to the reduced processing times and the uncertainty of the latency attributable to the firmware processor. For example, in certain configurations, it is not uncommon for the overhead of the firmware processor to rise to about 600 microseconds while receiving, storing and transferring one frame of data. This overhead would be increased if an interrupt also occurred during the processing of the frame. In a 32X CD-ROM each frame of data arrives about every 417 microseconds, thus the need for burst transfer of a group of frames is vital.

As a result, the next generation of CD-ROM drives would likely require larger groups of frames and a larger drive memory 34. This tends to increase the complexity of the storage device and manufacturing costs, and may affect the capability of the storage device to support certain time-critical read operations.

Figure 4:
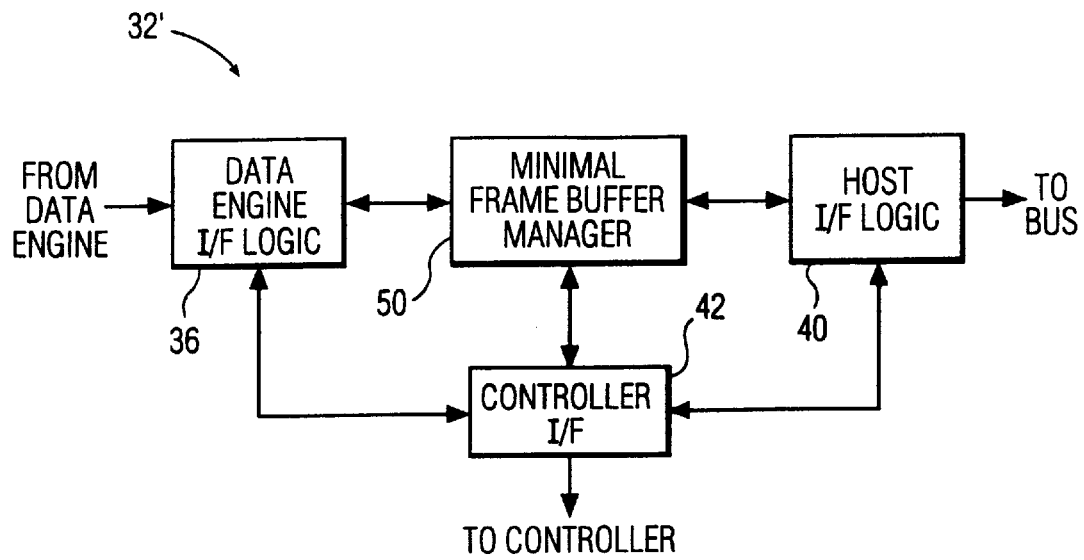
FIG. 4 is a block diagram depicting an improved block decoder formed on a single integrated circuit (IC) die, in accordance with certain embodiments of the present invention; the improved block decoder having a minimal frame buffer manager that does not require the use of a separate drive memory and transfers no more than one frame at a time.

With this additional background in mind, FIG. 4 is a block diagram depicting an improved block decoder 32' having a minimal frame buffer manager 50 that transfers no more than one frame of data at a time, in accordance with certain exemplary embodiments of the present invention. Improved block decoder 32' shares similar circuits with block decoder 32 in FIG. 3. For example, the functioning of data engine interface logic 36, host interface logic 40, and controller interface logic 42 remains substantially unchanged. However, improved block decoder 32' replaces both block decoder 32 and drive memory 34.

Since improved block decoder 32' is embodied entirely in hardware, it does not require firmware intervention to maintain data streaming to host 12. Consequently, the overhead associated with improved block decoder 32' in processing a frame of data is substantially less than a conventional block decoder 32 having a firmware-based buffer manager 38 and firmware program. Therefore, the amount of buffering of frames within storage device 22 can be significantly reduced, and in certain configurations minimized. As described in detail below, frames or even sub-frames of data can be transferred to host processor 12 with minimal delay, in accordance with certain embodiments of the present invention. Since the latency associated with the improved block decoder 32' is small (e.g., propagation delays are typically as low as about 200–500 nanoseconds) the limiting factor on the data transfer rate that can be supported is essentially the operation and latency of host processor 12 during the read operation.

In accordance with certain preferred embodiments of the present invention, improved block decoder 32' is fabricated in a single IC chip or die. Those skilled in the art will recognize that buffer 56 (see, FIG. 5) within improved block decoder 32' is small enough to be feasibly and/or economically fabricated using conventional logic fabrication processes, or conversely that the various logic circuitry within improved block decoder 32' and minimal buffer 56 can be fabricated using conventional random access memory (RAM) fabrication processes.

Improved block decoder 32' consists of hardware implemented logic as described below and depicted in the exemplary embodiments of FIGS. 5, 6A–D, 7, and 8. One skilled in the art will easily recognize that the logical functions, which include, for example buffers, registers, counters, and comparative/decision logic circuits can be configured in a variety of ways, utilizing conventional logic circuit design tools and fabrication processes. As such, the remainder of the description focuses on the logical functioning of the improved block decoder 32' during a read operation.

Figure 5:
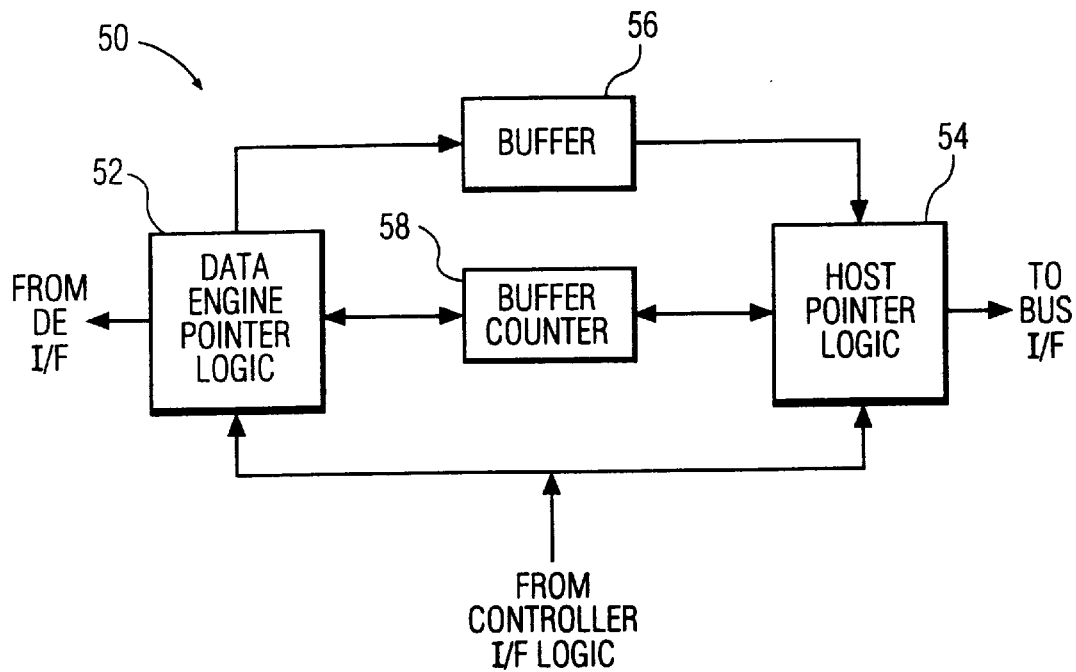
FIG. 5 is a block diagram depicting a hardware-based minimal frame buffer manager having a co-located buffer, counters and logic, as in FIG. 4, in accordance with certain embodiments of the present invention.

FIG. 5 is a block diagram depicting an exemplary minimal frame buffer manager 50, in accordance with certain embodiments of the present invention. Buffer manager 50 includes data engine pointer logic 52, host pointer logic 54, a buffer 56, and a buffer counter 58.

One of the important aspects in the design of buffer manager 50 is the desire to minimize the size of buffer 56, which is used to store a frame, or a portion thereof (i.e., a sub-frame). Thus, in accordance with certain embodiments of the present invention, buffer 56 is configured to store two frames of data. One frame is used to store new incoming frames and the other is used to retrieve previously stored frames. Thus, for example, assuming a frame of data is about 3 kilobytes long, buffer 56 would have about 6 kilobytes (i.e., 2×3 kilobytes) of RAM, such as, static random access memory (SRAM). The amount of RAM could be further reduced in a configuration where the frame is smaller or a subframe of the data is to be transferred.

Two pointers are used to identify locations or addresses of the frames or sub-frames that are stored in buffer 56. There is a data engine pointer ($P_{DE}$) that is associated with the retrieved data frame or sub-frame from data engine 30 that needs to be stored, and a host pointer ($P_{HOST}$) that is associated with the data frame or sub-frame that needs to be transferred to host processor 12. The data engine pointer is established and managed by data engine pointer logic 52, which receives data from data engine 30 via data engine interface logic 36 and stores the received data in buffer 56. The host pointer is established and managed by host pointer logic 54, which retrieves stored data from buffer 56 and provides the retrieved data to host interface logic 40 and eventually to host processor 12.

Buffer counter 58 is responsive to commands from, and can be read by both, data engine pointer logic 52 and host pointer logic 54. The contents or count within buffer counter 58 represents the number of frames or slots (of a predetermined size) within buffer 56 that contain data that is ready to be transferred to host processor 12. Data engine pointer logic 52 is configured to increment buffer counter 58 upon storing a frame of data or filling a slot with a sub-frame of data. Host pointer logic 54 is configured to decrement buffer counter 58 upon retrieving and transferring the contents of a frame of data or a slot from buffer 56. Upon initialization or reset, buffer counter 58 is set to "zero".

Figure 6A:
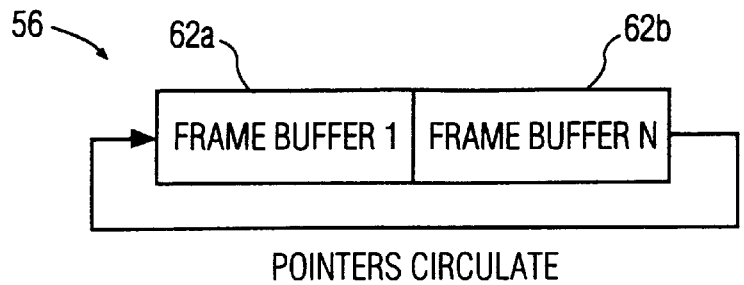
FIGS. 6A–D graphically demonstrate the storage and transfer of frame data into and out of the buffer, as in FIG. 5, during various exemplary time windows of a read operation, in accordance with certain embodiments of the present invention.

FIGS. 6A through 6D graphically depict buffer 56 and the use of pointers (i.e., $P_{DE}$ and $P_{HOST}$) to control access to the data stored therein during different time windows of a read operation. FIG. 6A depicts buffer 56 as having "N" frame buffers 62a–b. While the number of frame buffers can be more, it is preferred that there be only two (i.e., N=2), to minimize the cost of improved block decoder 32'. Frame buffers 62a–b in this exemplary arrangement are each configured to store one frame of data that is no more than about 3 kilobytes long. During a read operation, each of the pointers will point to either frame buffer "number one" or to frame buffer "number two", namely 62a or 62a, respectively. As illustrated, each of the pointers is incremented from frame buffer 62a to frame buffer 62b, and then circles back again to frame buffer 62a.

Figure 6B:
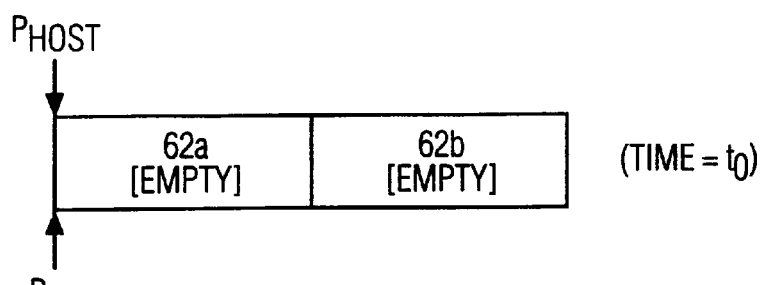

As depicted in FIG. 6B, at a time $t_0$, which is prior to the start of a read operation, both of the pointers are pointing or otherwise identifying frame buffer 62a. There is no new data in buffer 56 at time $t_0$, because a read operation has yet to be requested by host processor 12. Consequently, buffer counter 58 is equal to "zero".

Figure 6C:
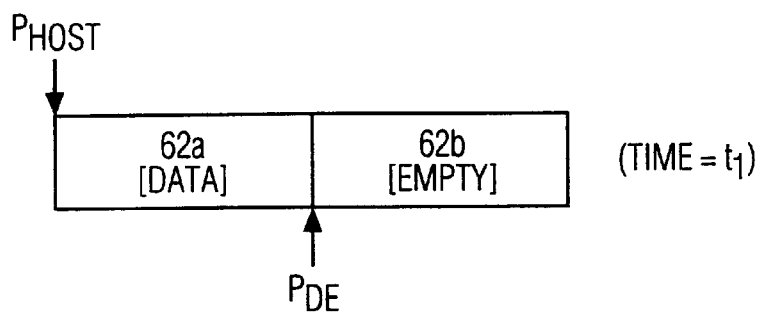

Referring next to FIG. 6C, at time $t_1$, which follows the start of a read operation, a frame of data has been completely stored in frame buffer 62a, and as such, $P_{DE}$ has been incremented or otherwise set to identify frame buffer 62b, and buffer counter 58 has been incremented to "one" by data engine pointer logic 52.

Following time $t_1$, data engine pointer logic 52 is able to begin writing the next frame of data received to frame buffer 62b, provided that $P_{DE}$ does not equal $P_{HOST}$.

When $P_{DE}$ is changed to identify frame buffer 62b, then $P_{HOST}$ does not equal $P_{DE}$, and host pointer logic 54 is allowed to retrieve the stored frame in frame buffer 62a and transfer the frame to host processor 12, provided also that buffer counter 58 does not equal "zero". When the host pointer logic 54 has completed the transfer, it decrements buffer counter 58. For example, buffer counter may be decremented from "one" back to "zero", or in other cases wherein host 12 has waited for some reason and the buffer count is higher, from "two" to "one". Host pointer logic 54 also increments or otherwise sets $P_{HOST}$ to identify frame buffer 62b. Buffer 56 is preferably configured to support simultaneous access to frame buffers 62a and 62b.

Figure 6D:
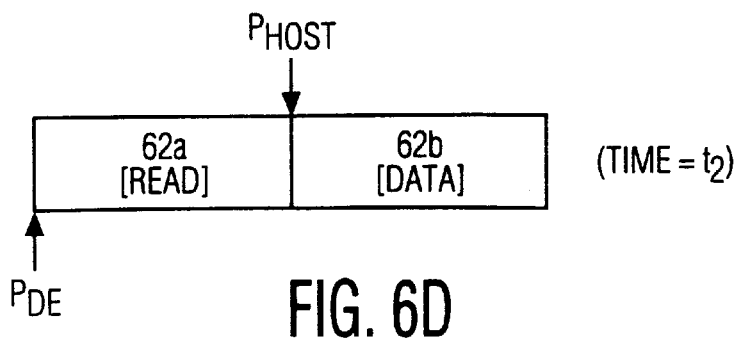

Continuing with the read operation, at time $t_2$, as shown in FIG. 6D, data engine pointer logic 52 has completed storing a frame of data to frame buffer 62b, $P_{DE}$ has been changed to point to frame buffer 62a, and buffer counter 58 has again been incremented to "one" by data engine pointer logic 52. When $P_{DE}$ is changed, then $P_{HOST}$ does not equal $P_{DE}$, and thus host pointer logic 54 can retrieve the stored frame in frame buffer 62b and transfer the frame to host processor 12, provided also that buffer counter 58 does not equal "zero".

In this manner, the $P_{HOST}$ essentially attempts to catch up with $P_{DE}$ during a read operation, or vice versa. If $P_{DE}$ gets far enough ahead of $P_{HOST}$ to completely circle buffer 56 and actually equals $P_{HOST}$ (e.g., attempts to pass $P_{HOST}$) then an overflow condition exists. When there is an overflow condition, data engine pointer logic 52 prevents more data from entering buffer 56 and signals data engine interface logic 36 and/or drive controller 26 to stop the data stream from data engine 30. When host pointer logic 54 is finally able to transfer the next frame to host processor 12, then $P_{HOST}$ is incremented and $P_{DE}$ no longer equals $P_{HOST}$. At this point, the overflow condition has ended and data engine pointer logic 52 again signals data engine interface logic 36 and/or drive controller 26 to restart the data stream by way of a re-seek operation. The re-seek operation causes storage device 22 to eventually return to the point in the read operation where the overflow condition occurred.

Figure 7:
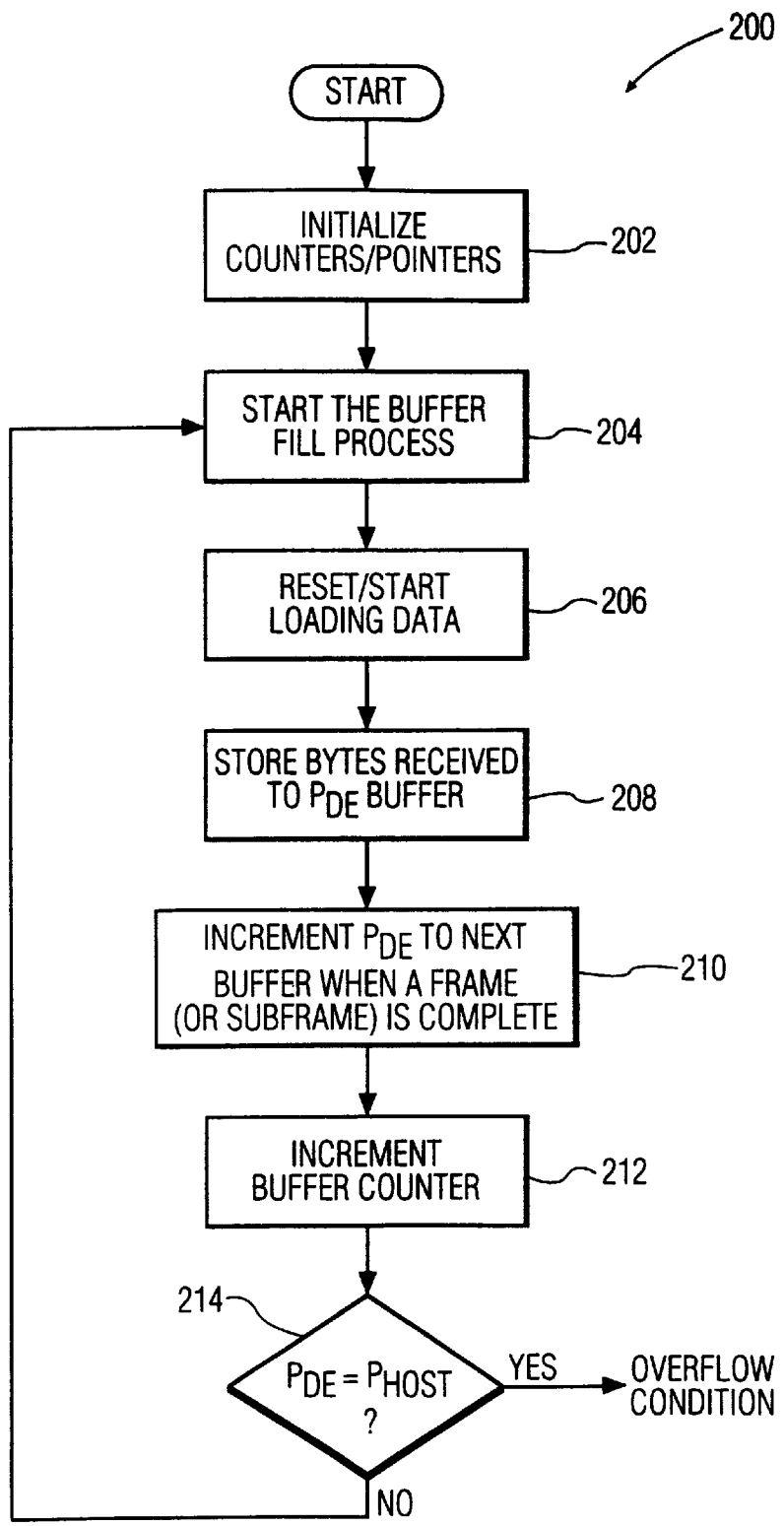
FIG. 7 is a flow diagram depicting a process, which is embodied in the logic of the minimal frame buffer manager, for storing data in the buffer, in accordance with certain embodiments of the present invention.

FIG. 7 depicts a flow diagram of a read operation process 200 that is embodied substantially within data engine pointer logic 52, in accordance with certain embodiments of the present invention. Process 200 includes an initialization step 202, wherein buffer counter 58, $P_{DE}$ and $P_{HOST}$ are set or reset to initial values.

After initialization, in step 204, storage device 18 awaits the receipt of a read request command from host processor 12. A read request command essentially requests transfer of a specific block of data from storage medium 22 to host processor 12. The block of data typically includes a plurality of frames of data. In response, storage device 18 locates, reads, and transfers the block of data as either frames or sub-frames of data to host processor 12, over bus 16, for example. As part of step 204, storage device 12, and more preferably either improved block decoder 32 or device controller 26, sends an acknowledgement or similar response to host processor 12.

Next, in steps 206 and 208, data engine pointer logic 52 resets buffer counter 58, if needed, and starts receiving the block of data read from storage medium 22. As part of step 206, data engine pointer logic 52 increments an index pointer or similar index mechanism to track the number of received bytes (or other increments) of data. As part of step 208, the received bytes are stored in buffer 56 at a location identified by $P_{DE}$. When an entire frame or a predetermined sub-frame of data has been received and stored in buffer 56, then in step 210, the $P_{DE}$ is incremented to identify a next location in buffer 56. Similarly, in step 212, when the entire frame or the predetermined sub-frame of data has been received and stored in buffer 56, then buffer counter 58 is incremented.

A decision is made in step 214 based on a comparison of $P_{DE}$ and $P_{HOST}$. If $P_{DE}$ and $P_{HOST}$ identify the same location in buffer 56, then there is an overflow condition, as described above, and process 200 is exited. If $P_{DE}$ and $P_{HOST}$ do not identify the same location in buffer 56, then process 200 continues to step 216. If an overflow condition has not occurred, then process 200 returns to step 208 to receive the next frame or sub-frame of data.

Figure 8:
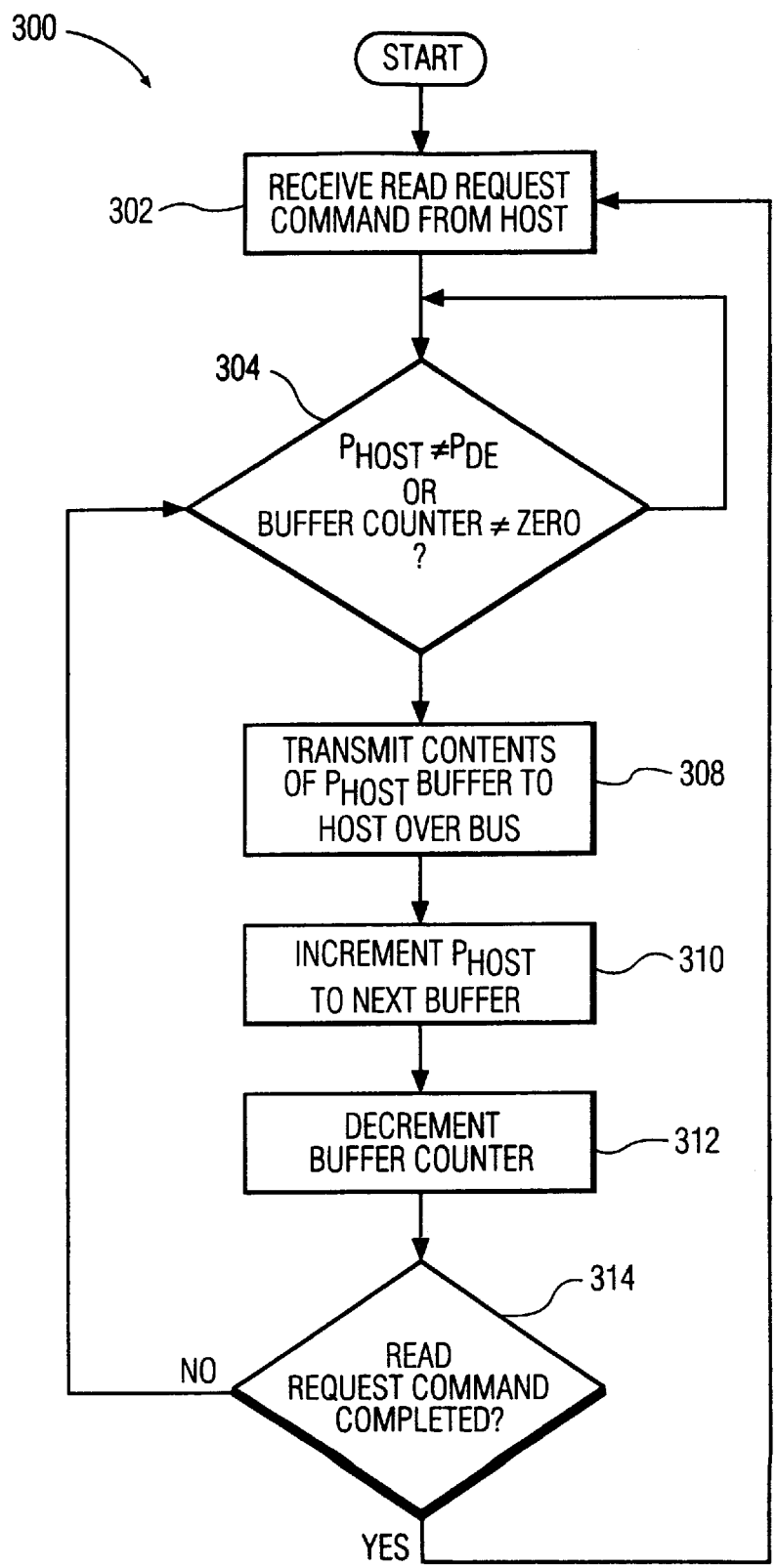
FIG. 8 is flow diagram depicting a process, which is embodied in the logic of the minimal frame buffer manager, for transferring stored data from the buffer to a host processor, in accordance with certain embodiments of the present invention.

FIG. 8 depicts a flow diagram of a corresponding read operation process 300 that is embodied substantially within host pointer logic 54, in accordance with certain embodiments of the present invention. Process 300 includes step 302, wherein storage device 18 awaits the receipt of a read request command from host processor 12.

Upon receipt of a read request command, process 300 continues to step 304, wherein a decision is made based on a comparison of $P_{HOST}$ and $P_{DE}$, and/or the count in buffer counter 58. If $P_{HOST}$ and $P_{DE}$ do not identify the same location in buffer 56, or buffer counter 58 does not equal "zero", then process 300 continues to step 308. If $P_{HOST}$ and $P_{DE}$ identify the same location in buffer 56, or buffer counter 58 is equal to "zero", then the process 300 waits at step 304.

When buffer counter 58 is greater than "zero", then there is data within the buffer 56, at the location identified by $P_{HOST}$, which is now ready to be transferred to host processor 12. The data that is stored in the frame buffer or slot of buffer 56, as identified by $P_{HOST}$, is then transferred in step 308, to host processor 12, for example, through host interface logic 40, bus interface 35 and bus 16. Next, in step 310, $P_{HOST}$ is incremented to identify a next location in buffer 56. In step 312, buffer counter 58 is decremented.

A decision is then made, in step 314, if the read request command has been completed. If the entire block of data has been transferred to host processor 12, then the read operation has been completed and an associated status signal is provided to host processor 12 by storage device 18. If the read operation has been completed, then process 300 returns to step 302 to await the next read request command. If the read operation has not been completed, then process 300 returns to step 304 and attempts to transfer the next frame or sub-frame of data to host processor 12.

In accordance with still further embodiments of the present invention, process 200 and process 300 can be combined together and a unified logic provided within improved block decoder 32'. It is also recognized that additional hand-shaking or other status signaling can be included within either process 200 or 300 to provide the necessary communications between one or more circuits/devices.

Although the various logic functions/circuitry in the exemplary embodiments of improved block decoder 32' and/or buffer manager 50 are depicted as being separate, it is recognized and expected that the actually logic circuitry may be combined or otherwise grouped together to increase efficiency and/or performance.

Figure 9:
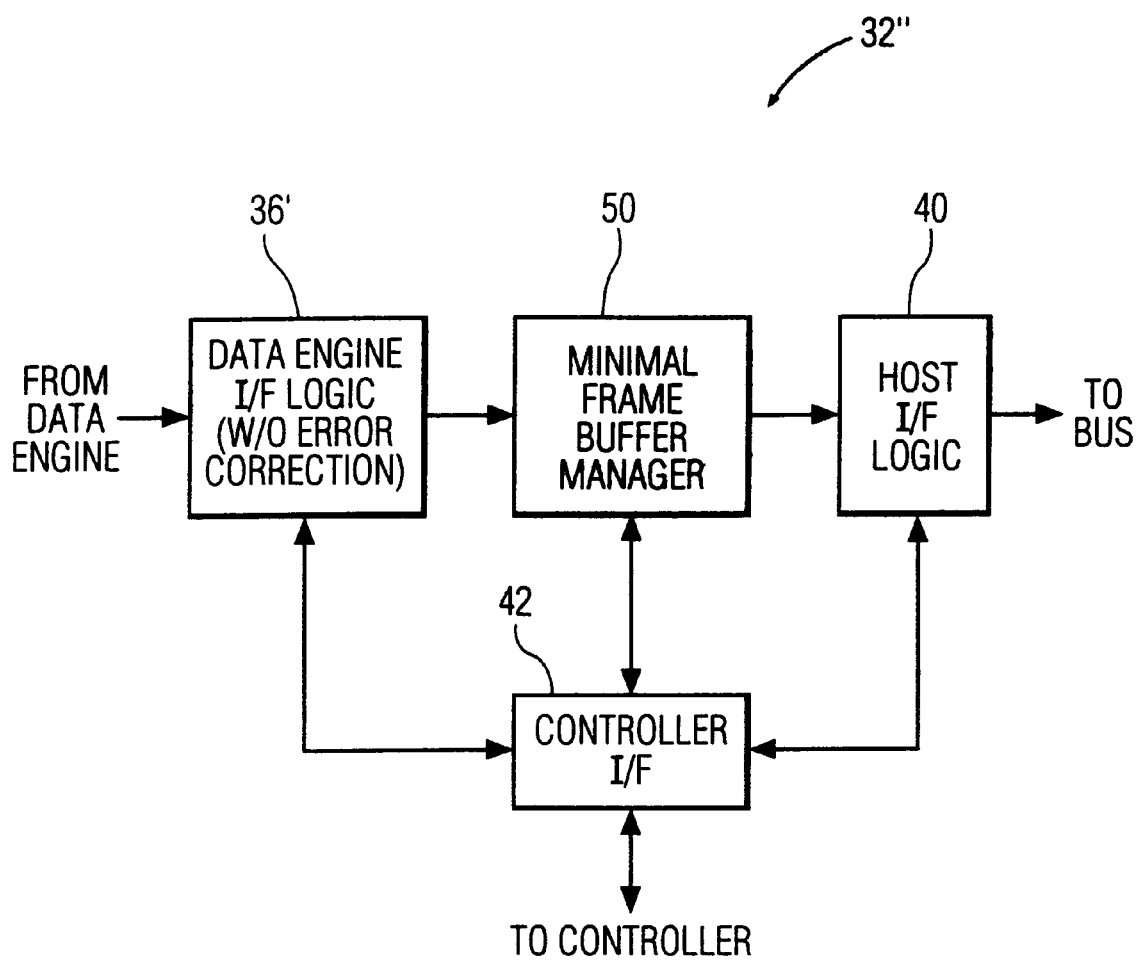
FIG. 9 is a block diagram depicting an improved block decoder having a minimal frame buffer manager and a reduced function data engine interface logic for use with a host processor having an increased function device driver capability, in accordance with certain further embodiments of the present invention.

In accordance with still other embodiments of the present invention, an improved block decoder 32" includes a reduced-function data engine interface logic 36'. FIG. 9 depicts improved block decoder 32", which is similar to improved block decoder 32' in FIG. 4, with the exception that improved block decoder 32" includes reduced-function data engine interface logic 36' instead of data engine interface logic 36. As described in more detail below, improved block decoder 36" can be used within a low-cost storage device 18 provided that host processor 12 has a device driver having increased functional capability.

One of the reasons for providing improved block decoders 32' and/or 32" is to streamline the data block transfer process. In accordance with one aspect of the present invention, improved block decoders 32' and/or 32" essentially streamline the data block transfer process by reducing the need for a complex firmware-based buffer management capability.

This streamlining approach is applied to the error detection/correction capability within the data engine interface logic 36'. For example, in accordance with certain embodiments of the present invention, specific functionality (e.g., error correction of the main data in a frame of data) that is usually provided in certain configurations of data engine interface logic 36 is shifted to host processor 12, thereby allowing the resulting complexity of data engine interface logic 36' to be significantly reduced. This reduced complexity tends to reduce the operating latency/performance and the manufacturing costs associated with block decoder 32'.

Thus, the functionality of data engine interface logic 36', in accordance with certain exemplary embodiments of the present invention, does not include a complete error correction suite. Instead, data engine interface logic 36' essentially conducts a limited set of checks/functions on the data prior to passing the data to minimal frame buffer manager 50.

Based on the results of the limited set of checks/functions performed by data engine interface logic 36', for each frame of data, status data is inserted into the unused portions of the main data in each frame of data. For example, a status word or words can be added to the spare (unused) area of each frame of data prior to passing the frame of data to minimal frame buffer manager 50.

The status words identify particular results of the limited set of checks/functions performed on the data. By way of example, several flag identifiers can be included in a status word, wherein each flag identifier represents the results of a particular check/function. Once the frame of data has been transferred to host processor 12, the status word or words are used by host processor 12 (e.g., running a storage device driver program) to determine if additional processing is necessary for each frame of data.

In this manner, certain complex and/or time consuming functions are advantageously performed by host processor 12, rather than block decoder 32". It has been found, for example, that the error correction functions associated with the main data can be efficiently conducted by host processor 12, thereby significantly reducing the complexity of the data engine interface logic 36' within block decoder 32". For example, about 4 kilobytes of local buffering memory (not shown) is required to conduct error correction of the main data within a conventional block decoder 32. Moving the error correction processing to host processor 12, eliminates the need for this much buffering memory within block decoder 32". There is also a substantial decrease in the amount/complexity of associated hardware logic within data engine interface logic 36', when compared to a conventional data engine interface logic 36 that performs data correction on the main data. For example, in certain embodiments, the logic gate count can be reduced from about 40,000 to about 15,000.

Thus, in accordance with certain embodiments of the present invention, data engine interface logic 36' conducts at least one of the following known checks/functions (but not necessarily in the following order). Data engine 80 determines if a sync slip occurred in the main data, and sets a MD sync slip flag within a two-byte status word accordingly. Similarly, data engine interface logic 36' determines if a sync slip occurred in the subcode data, and sets a subcode sync slip flag within the two-byte status word accordingly.

Data engine interface logic 36' further conducts a CRC on the Q-channel portion of the subcode data, in accordance with known/standardized algorithms, and sets a Q-channel CRC failure flag within the two-byte status word accordingly. Data engine 80 also conducts an error detection check (EDC) on the main data using known/standardized algorithms, and sets an EDC failure flag within the two-byte status word accordingly. Data engine interface logic 36' also sets other flags within the two-byte status word regarding other conventional data checks, such as, for example, a C2 pointer flag based on a C2 data check.

Data engine interface logic 36' also determines if the minute-second-frame (MSF) for the frame is correct (i.e., appears to be in the correct order compared to previous frame's MSF), and sets a MSF flag within the two-byte status word accordingly. Data engine interface logic 36' is configured to recognize if the mode field in the frame header has changed unexpectedly, for example, from the previous frame of data. Data engine interface logic 36' sets a mode flag in the two-byte status word to identify whether such a mode change occurred.

Data engine interface logic 36' can also be configured to conduct an interpolation, or otherwise provide the appropriate synchronization pattern or sync data within the main data of a frame of data when, for some reason, the sync data does not exist or is incomplete. If data engine interface logic 36' provides the sync data within a frame of data, then an interpolation flag will be set to identify that the sync data was inserted or otherwise completed by data engine interface logic 36'.

Host processor 12 is responsive to the 2-byte (or other length status word) in each frame of data. For example, a MD sync slip flag can identify that there may have been a sync slip in the main data, which may require correction. Similarly, a subcode sync slip flag identifies that there may have been a sync slip in the subcode data, which may require correction. A Q-channel CRC failure flag may also cause host processor 12 to attempt to further investigate the validity of the Q-channel data, in certain instances.

If the EDC failure flag identifies that an error was detected in the main data, then host processor will cause a conventional error correction process to be conducted by host processor 12 to correct the main data. A C2 pointer flag, which is based on a C2 data check, which is typically conducted in data engine 30, further provides host processor 12 with information about the processing that has already been conducted by data engine interface logic 36'. Likewise, host processor 12 is further configured to respond, as required, to correct or otherwise address problems identified by the MSF flag, mode flag and interpolation flag.

Depending on the flagged problem/feature, the information provided in the status word may require host processor 12 to ignore data, substitute data, correct data, and/or request new data from storage device 18.

As a result of the present invention, improved block decoder 32' (or 32") allow data that is retrieved from storage medium 22 to be essentially transferred to host processor 12, via bus 16, in a continuous stream with only a minimal number of interrupts to controller 26, namely, a first interrupt upon receipt of a request for a block of data from host processor 12, and a second interrupt upon completion of the transfer of the entire block of data to host processor 12, assuming no overflow conditions occur within improved block decoder 32' (or 32').

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A data storage device for use with a computer system, the data storage device comprising:
   a storage medium;
   a read assembly arranged to read data from the storage medium and output a read signal;
   a data engine arranged to receive the read signal and output digital data based on the read signal; and
   a decoder circuit, including a minimal frame buffer manager for transferring no more than one packet of the digital data at a time, arranged to receive the digital data and sequentially output a first portion of the digital data and a second portion of the digital data, the decoder circuit being formed on a single integrated circuit die and comprising memory and logic, wherein the logic is arranged to identify a first portion in the first location and the second portion in the second location, and while storing the second portion in the second location, retrieve the first portion from the first location and output the first portion.

2. The data storage device as recited in claim 1, wherein the memory comprises a first buffer and a second buffer, the first buffer being identified by the first location and the second buffer being identified by the second location, and wherein the first buffer is about the same size as the first portion and the second buffer is about the same size as the second portion.

3. The data storage device as recited in claim 2, wherein each of the first portion and second portion comprise a plurality of bytes of the digital data, and the logic further comprises a first re-settable counter that is arranged to identify a number of frames of data of the digital data stored by the logic in the memory.

4. The data storage device as recited in claim 3, wherein the logic further comprises a second re-settable counter that is arranged to identify a number of selected portions of the digital data signal stored by the logic in the memory.

5. The data storage device as recited in claim 4, wherein the first and second portions of the digital data comprise between about 2 and about 3 kilobytes of the digital data, and the memory comprises about 6 kilobytes of random access memory (RAM).

6. The data storage device as recited in claim 1, wherein the storage medium is an optical storage disc.

7. The data storage device as recited in claim 1, further comprising a bus interface arranged to receive the first portion output by the decoder circuit and output a formatted portion that is suitable for transmission over a bus to at least one external device.

8. The data storage device as recited in claim 1, further comprising a controller operatively coupled to the read assembly, the data engine and the decoder circuit, and arranged to selectively control generation of the read signal by the read assembly, generation of the digital data by the data engine, and output of the first portion by the decoder circuit.

9. The data storage device as recited in claim 1, wherein the decoder circuit is further configured to detect at least one error within the digital data and to identify, within the digital data, that the error was detected.

10. The data storage device as recited in claim 9, wherein the decoder circuit inserts status data within the digital data, the status data identifying that the error was detected.

11. The data storage device as recited in claim 10, wherein the status data includes at least one identifier selected from a set of identifiers including a main data synchronization slip flag, a subcode data synchronization slip flag, a Q-channel cyclic redundancy check (CRC) failure flag, an error detection check (EDC) flag, a C2 pointer flag, a minute-second-frame (MSF) flag, a mode flag, and an interpolation flag.

12. A method for transferring a block of data from a storage medium to an external device, the method comprising the steps of:
   1) generating a streaming digital signal by sensing data recorded on a storage medium;
   2) dividing the streaming digital signal into a plurality of packets;
   3) using a single integrated circuit including a minimal frame buffer manager for transferring no more than one packet of the digital data at a time and data pointer logic, to:
      a) store a first packet in a first buffer in the integrated circuit during a first time window;
      b) store a subsequently generated second packet in a second buffer in the integrated circuit during a second time window;
      c) retrieve the first packet from the first buffer during the second time window; and
   4) providing the first packet to an external device during the second time window, wherein the second time window begins immediately after the first time window ends.

13. The method as recited in claim 12, wherein as part of step 3) the single integrated circuit is further used to:

d) store a subsequently generated third packet in the first buffer during a third time window;

e) retrieve the second first packet from the second buffer during the third time window; and wherein the method further comprises;

5) providing the second packet to the external device during the third time window, and wherein the third time window begins immediately after the second time window ends.

14. The method as recited in claim 13, wherein steps 3) further comprises decrementing the buffer count each time one of the plurality of packets is retrieved from either the first buffer or second buffer.

15. The method recited in claim 12, wherein the step of dividing the streaming digital signal into a plurality of packets further includes detecting at least one error within the streaming digital signal, and identifying within each of the plurality of packets that the error was detected.

16. The method as recited in claim 15, wherein the step of identifying within each of the plurality of packets that the error was detected further includes inserting status data within each of plurality of packets, wherein the status data identifies that the error was detected.

17. The method as recited in claim 16, wherein the status data includes at least one identifier selected from a set of identifiers including a main data synchronization slip flag, a subcode data synchronization slip flag, a Q-channel cyclic redundancy check (CRC) failure flag, an error detection check (EDC) flag, a C2 pointer flag, a minute-second-frame (MSF) flag, a mode flag, and an interpolation flag.

18. A method for use in a single integrated circuit in including providing a minimal frame buffer manager for transferring no more than one packet of digital data at a time and data pointer logic, that is configured to support a read operation within a storage device that generates a stream of data destined for an external device, the method further comprising the steps of:

1) storing portions of a stream of digital data to a first buffer;

2) storing subsequent portions of the stream of digital data to a second buffer, while also transferring the contents of the first buffer to an external device;

3) storing further subsequent portions of the stream of digital data to the first buffer, while also transferring the contents of the second buffer to the external device; and 4) repeating steps 1 through 4 until the stream of digital data stops.

19. A single integrated decoder circuit, including providing a minimal frame buffer manager for transferring no more than one packet of digital data at a time, for use in a storage device, the decoder circuit further comprising:

an input interface circuit operatively configured to connect to, and receive incoming digital data from, a first external source;

an output interface circuit operatively configured to connect to, and transfer outgoing digital to, a second external source;

memory having an identifiable first buffer and an identifiable second buffer, wherein the memory is arrange to allow simultaneous read/write access to the first buffer and the second buffer; and logic coupled to the input interface circuit, the output interface circuit and the memory, the logic being arranged to conduct simultaneous read/write access to the first buffer and the second buffer for storing portions of incoming digital data to the second buffer while generating the outgoing digital data by transferring the contents of the first buffer to the output interface circuit, and subsequently storing further subsequent portions of the incoming digital data to the first buffer while generating the outgoing digital data by transferring the contents of the second buffer to the output interface circuit.

* * * * *